Feb. 3, 1925.
W. A. LORENZ
1,525,191
APPARATUS FOR OBTAINING CHARGES OF MOLTEN GLASS
Filed April 4, 1922
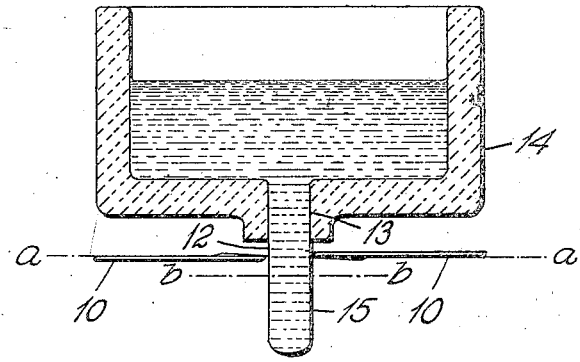
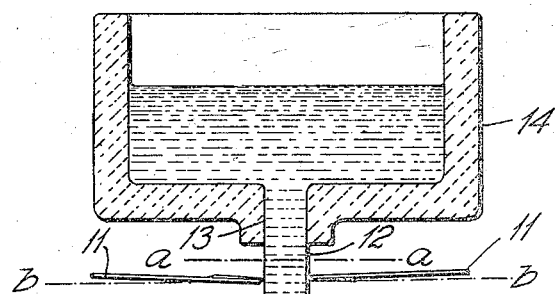
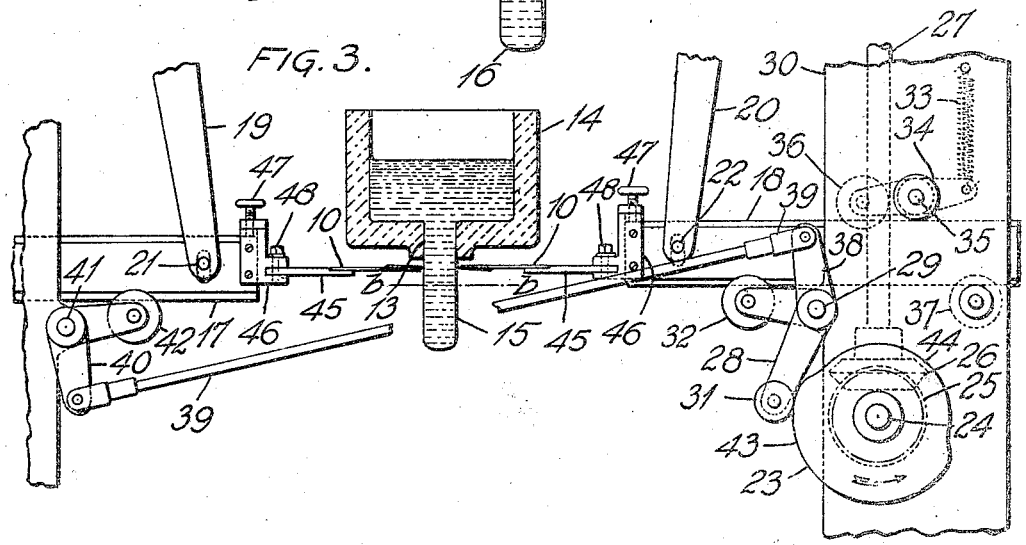
INVENTOR:
WILLIAM A. LORENZ
BY
ATTY.

Patented Feb. 3, 1925.

1,525,191

UNITED STATES PATENT OFFICE.

WILLIAM A. LORENZ, OF HARTFORD, CONNECTICUT, ASSIGNOR, BY MESNE ASSIGNMENTS, TO HARTFORD-EMPIRE COMPANY, OF HARTFORD, CONNECTICUT, A CORPORATION OF DELAWARE.

APPARATUS FOR OBTAINING CHARGES OF MOLTEN GLASS.

Application filed April 4, 1922. Serial No. 549,450.

*To all whom it may concern:*

Be it known that I, WILLIAM A. LORENZ, a citizen of the United States, residing at Hartford, in the county of Hartford and State of Connecticut, have invented new and useful Improvements in Apparatus for Obtaining Charges of Molten Glass, of which the following is a specification.

This invention relates to apparatus for separating molten glass into mold charges, its object being to provide suitable means for producing mold charges of different sizes and weights in a desired order of succession, including means for varying the relative proportions of the charges at will.

By suitably varying the size of the charges in a given series or cycle of severing operations, and repeating the series, a plurality of molds or shaping machines for making glassware of different sizes or weights may be regularly and continuously supplied with the required sizes of mold charges, and in the required order, from a single feeding machine.

In the present method, the different size mold charges are obtained from glass discharged and suspended from the outlet of a container by a single severing device operating alternately at the desired levels below the outlet, or in any other order desired.

All the charges of a given series may be of different sizes, or two or more of them may be of equal size.

The length and size of any mold charge obtained by the present method is proportionate to the distance of the plane in which it is severed from the plane in which the preceding charge was severed, assuming a given size outlet with a uniform rate of discharge and equal time periods of severing.

The amount of glass discharged during any cycle of operation of the machine for producing the different size charges in the series is dependent on the rate of flow, which may be varied by means of an adjustable regulating plug or valve in or adjacent the discharge outlet, or by varying the depth of glass, and hence the hydrostatic head over the outlet, by means of an adjustable gate controlling the flow of glass to the container from a melting furnace or other source of supply, both of these methods being well known.

The charges, when severed, may be distributed and delivered to a set or series of the intended molds on one or more shaping machines, by a suitable delivering mechanism, such as that shown in U. S. Patent 1,373,202, of March 29, 1921.

In the drawings:—

Figures 1 and 2 are diagrammatic views showing the different levels at which the glass is severed, and Fig. 3 is an elevation in diagrammatic form, illustrating in part the mechanism employed for severing the charges at the different levels.

The upper and lower severing planes are indicated by the dot and dash lines $a$—$a$ and $b$—$b$ respectively, and the shear blades 10 and 11 are shown in position to begin severing at these planes, from a column of glass 12 discharging from the outlet 13 of a container 14.

The difference in the sizes of the charges severed in alternation in a given cycle is equal to twice the distance between the severing planes, because in severing at the upper level the length of the charge is increased by the distance between the planes, and in severing at the lower level, the length is diminished by the same distance.

In Fig. 2 the amount of glass below the severing plane $b$—$b$, indicated at 15, is the amount assumed for the smaller charge. If the length of this charge is assumed to be two inches and the distance between the severing planes one-half inch, then the length of the longer charge, indicated at 16 in Fig. 1, will be three inches, still assuming a uniform rate of discharge with equal time periods between severing operations.

In a given cycle of operation, it may be desirable to sever a plurality of charges of equal weights in succession, followed by one or more charges of different weights in the same cycle. This can be done by the use of the proper number of cams or cam lobes proportioned to give the desired results, and arranged so as to operate at the required times, and in the required sequence.

In practicing the present method, it is not necessary to limit the movement of the shears to effect complete severing in a horizontal plane, since the shears may be lowered while severing to avoid piling of the glass thereon, as shown and described in U. S.

Patents 1,362,785, of December 21, 1920, and 1,379,594, of May 24, 1921.

Any suitable type of shear blades may be employed, such as those described and claimed in U. S. Patent 1,326,460, of December 30, 1919. Blades of this type, if moved downwardly while severing, are free to rock one upon the other, insuring constant contact between their cutting edges throughout their cutting stroke, and thus making a clean cut at each operation.

On the opposite sides of the container are the reciprocally mounted shear bars 17 and 18, actuated by the levers 19 and 20, pivotally connected with the bars 21 and 22 in a manner to permit free up and down movement of the latter. The levers may be oscillated in unison by a suitable mechanism, such as that shown in U. S. Patent 1,379,594, of May 24, 1921. The raising and lowering of the shear bars to the desired levels is controlled by a cam 23 on a shaft 24 having a gear 25 meshing with a gear 26 on the vertical shaft 27, which may be suitably geared to and driven by the lever operating shaft shown in the last mentioned patent, or by other suitable means. The cam 23 will be suitably timed with respect to the shear bar operating mechanism, so as to properly move the shears to the desired levels. The right hand shear bar 18 is raised by a cam controlled bell crank 28, pivoted on a stud 29 carried by the frame member 30, said bell crank having a lower roller 31 engaging the cam 23 and an upper roller 32 engaging the under side of the bar 18. The bar 18 is held yieldingly upon the roller 32 by a spring 33 connected with a lever 34 pivoted at 35 and carrying a roller 36 engaging the upper side of the bar. A fixed roller 37 on the under side of the bar forms a support and guide for the latter, in conjunction with the rollers 32 and 36. The tension of the spring 33 is sufficient to hold the bell crank roller 31 in engagement with the cam 23 under all conditions of operations. The left hand shear bar 17 may also be controlled in its up and down movements by a similar cam device suitably geared and synchronized with the cam 23. Or it may, as herein shown, be operated by the cam 23, through the bell crank 28, with which is connected an arm 38 carrying a rod 39 connected with a bell crank 40. The bell crank 40 is pivoted on a stud 41 and is provided with a roller 42 engaging the under side of the shear bar 17, to raise the bar at the same time and to the same extent as the bar 18 is raised. The bar 17 is yieldingly held upon the roller 42 and guided in its movements by a fixed roller and a spring pressed roller, the same as in the case of the right hand shear bar. The cam 23 is provided with two lobes 43 and 44, which alternately position the shears at the levels a—a and b—b respectively. The cam lobes may, if desired, be shaped so as to lower the shears during or after cutting, and to hold them below and clear of the glass during their return to movement.

The cam 23 is preferably placed at the end of its shaft to enable it to be readily removed and replaced by different cams suited for the results desired.

The shear blades are mounted on holders 45 carried by brackets 46, suitably mounted for vertical adjustment on the ends of the shear bars, the adjustment being effected by turning a screw 47, which may be done while the machine is in operation to vary the levels or distance between the level, if desired. Lateral adjustment of the shears can be effected by loosening the clamp screws 48 passing through the slots in the jaws of the brackets 46. More elaborate devices for mounting and adjusting the shear blades vertically and laterally may be provided if desired, such as that shown in Patent 1,405,936, of February 7, 1922.

After the cam has been selected with the correct proportions to afford the desired distance between severing planes and the operation of the machine begun, if necessary, the sizes of the charges may be varied to some extent by varying the rate of discharge of the glass, as by the use of a regulating plug or valve in or adjacent the discharge outlet, or otherwise as mentioned above.

The invention described and claimed herein may be modified in various ways to suit different conditions of service, without departing from the scope of the invention as defined by the appended claims.

I claim:

1. Apparatus for separating a column of molten glass into mold charges, comprising severing means, means for periodically actuating said severing means, and means for successively moving said severing means between different operating planes.

2. Apparatus for separating mold charges of different sizes from suspended molten glass, comprising severing means, and means for periodically positioning said severing means at different severing levels to suit the different sizes required.

3. Apparatus for separating mold charges of different sizes from suspended molten glass, comprising a severing device, means for periodically raising and lowering said device to different levels, and means for actuating the device to sever the glass at said levels.

4. Apparatus for separating molten glass into mold charges of different sizes, comprising a severing device, means for periodically positioning said device to begin severing at different levels from glass suspended from the outlet of a container, and means for actuating the severing device to complete the severing of the charges at said levels.

5. Apparatus for separating mold charges of different sizes from suspended molten glass, comprising a severing device, cam mechanism for periodically moving said severing device to different severing planes, and means for actuating said device to sever the glass in said different planes.

6. Apparatus for separating mold charges of different sizes from suspended molten glass, comprising a severing device, including means for periodically moving the severing device to different severing planes, and means for changing the levels of the severing planes.

7. Apparatus for separating mold charges of different sizes from suspended molten glass, comprising a severing device, cam mechanism for periodically positioning the device at different severing levels, means for actuating the device to sever the glass periodically, and means for coordinating the movements of the positioning and the severing elements of the device.

8. Apparatus for separating mold charges of different sizes from a flowing column of glass, comprising a severing device, means for periodically raising and lowering said device to different levels, and means for actuating the device to sever the glass at said different levels at regular intervals.

9. Apparatus for separating mold charges of different sizes from a column of molten glass issuing from an outlet, comprising severing means mounted for vertical swinging movement, means for actuating said severing means to sever the glass, and means for periodically swinging said severing means vertically to different severing heights below the outlet.

10. Apparatus for separating mold charges of different sizes from a column of molten glass issuing from an outlet, comprising a plurality of coacting shearing devices mounted for movement below the outlet, independent means for supporting the respective severing devices, means for simultaneously reciprocating said severing devices on said supporting means, means for periodically changing the vertical positions of said supporting means in unison and at regular intervals prior to the time of severance to shift the paths of travel of said severing devices in a vertical direction, whereby said severing devices will sever the glass at different distances from said outlet.

Signed at Hartford, Connecticut, this 21st day of March 1922.

WILLIAM A. LORENZ.